Sept. 24, 1963 G. W. CRAWFORD 3,104,609
COMPRESSING AND SHAPING DEVICE
Filed Nov. 23, 1962 2 Sheets-Sheet 1
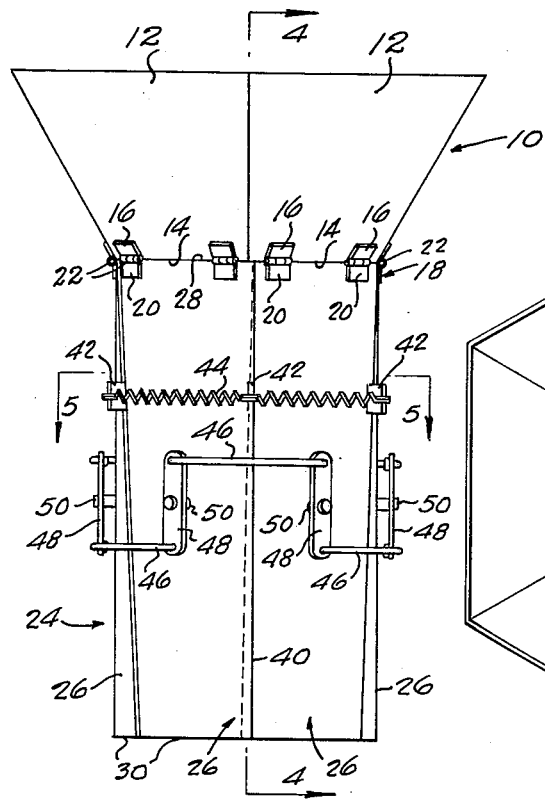
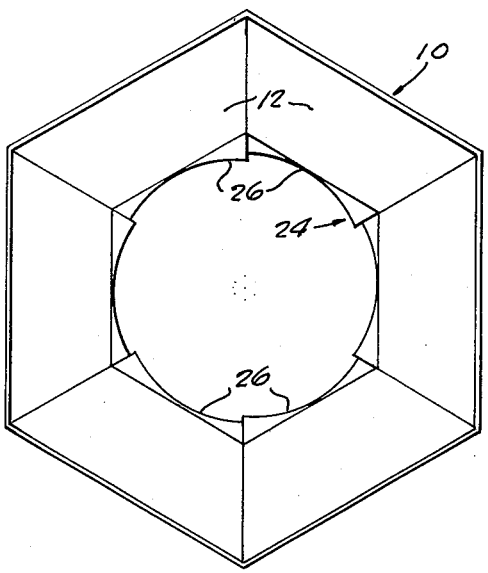
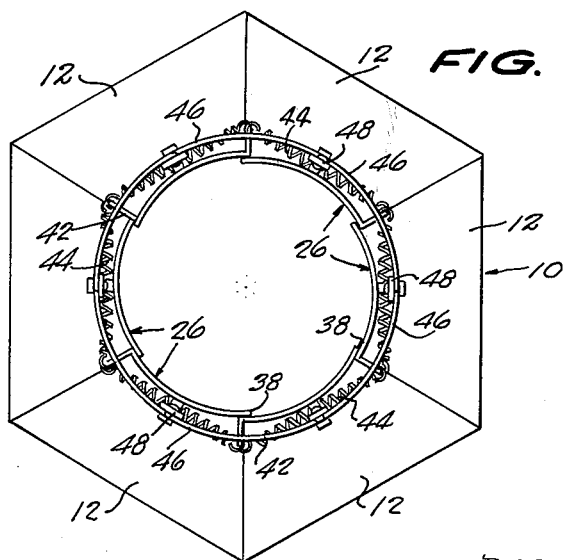
INVENTOR.
GUY W. CRAWFORD,
BY
McMorrow, Berman & Davidson
ATTORNEYS.

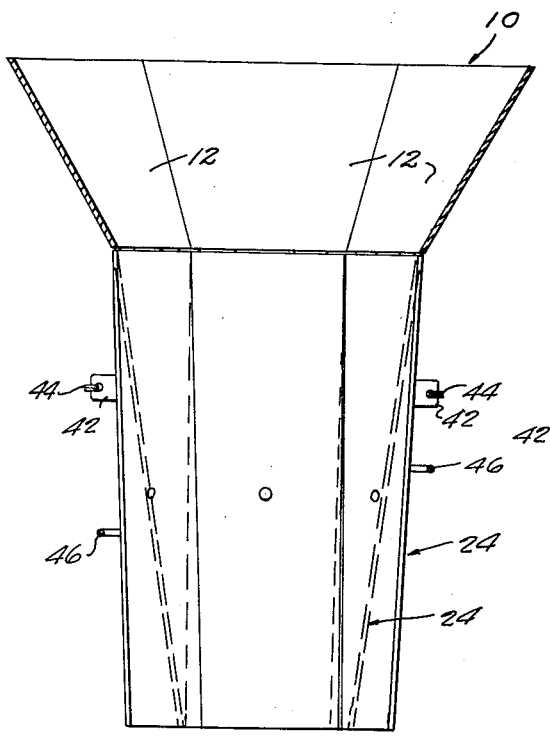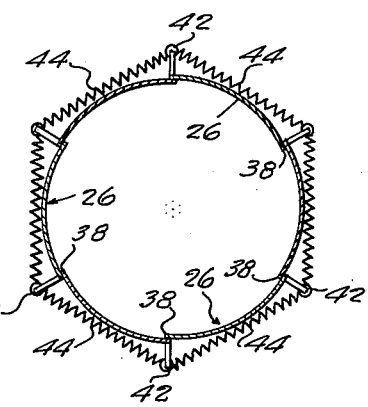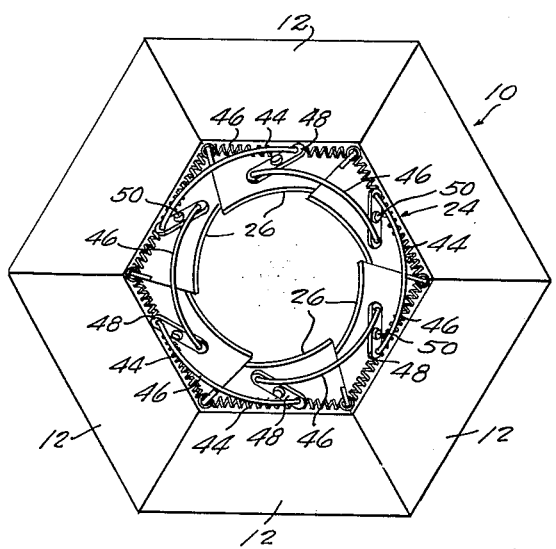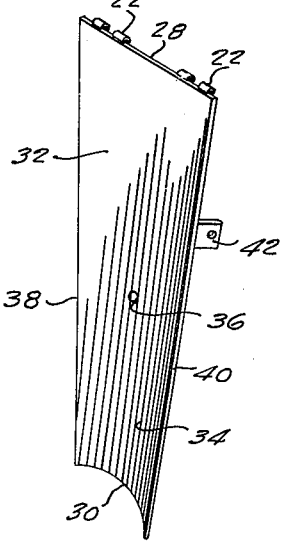

United States Patent Office 3,104,609
Patented Sept. 24, 1963

3,104,609
COMPRESSING AND SHAPING DEVICE
Guy W. Crawford, Box 124, Hesperia, Mich.
Filed Nov. 23, 1962, Ser. No. 239,724
6 Claims. (Cl. 100—296)

This invention relates to an improved device for compressing and shaping material and objects, such as shrubs and Christmas trees for compact packaging.

The primary object of the invention is the provision of a simple, efficient, and easily used device of the kind indicated which comprises an entrance funnel and a tube opening to the small end of the funnel which is composed of spring-contracted sections, the said device enabling the user to simply put the material or object to be compressed into the funnel and push the same through the tube to obtain the desired shaping and compressing thereof.

Another object of the invention is the provision on a device of the character indicated above, of equalizing means for the tube section which automatically transfers excess pressure from one or more tube sections to the other tube sections, which may be produced by projections or differences in density of the material or object passed through the device.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a device of the present invention;

FIGURE 2 is a top plan view thereof;

FIGURE 3 is a bottom plan view thereof, showing the tube sections in expanded condition;

FIGURE 4 is a transverse vertical section taken on the line 4—4 of FIGURE 1, showing the tube sections expanded, in full lines, and contracted, in phantom lines;

FIGURE 5 is a horizontal section taken on the line 5—5 of FIGURE 1;

FIGURE 6 is a bottom plan view of the device showing the tube sections in contracted condition; and, FIGURE 7 is a perspective view of a tube section.

Referring in detail to the drawings, wherein like numerals designate like parts throughout the several views, the illustrated device comprises a funnel 10 of polygonal shape, here shown as hexagonal, which has six flat downwardly tapering sides 12 having coplanar lower edges 14. Externally fixed to each of the sides 12 above their lower edges are the upper leaves 16 of a pair of hinges 18, having lower leaves 20 extending below horizontal pivotal connections 22 of the hinges, the last being on a level slightly below the lower edges 14 of the funnel sides 12.

The device further comprises an elongated sectional tube 24 which is composed of six downwardly tapering flat sections 26 having parallel upper and lower edges 28 and 30, respectively. The upper halves 32 of the sections 26, as shown in FIGURE 7, are substantially flat and merge, at their lower ends, into arcuate lower halves 34. The sections 26 have centered holes 36, at substantially their midheights, and have straight leading and trailing side edges 38 and 40, respectively. Apertured lugs 42 extend laterally outwardly from the sections 26, at their trailing edges 40, on a level spaced above the holes 36.

The lower hinge leaves 20 are suitably fixed to the outer sides of the sections 26, below their upper edges 28, whereby the sections are enabled to pivot in laterally inward and outward directions, relative to the sides 12 of the funnel 10.

As shown in FIGURES 3 and 6, the leading edges 38 of the tube sections 26 slidably underlap the adjacent sections, and the sections are held in their relationship by means of contractile coil springs 44, one to each section, which bear against the outer surfaces of the sections and are stretched between and secured to lugs 42 of adjacent sections.

In order to transfer excess outward pressure or excess inward pressure exerted on one or more of the sections, met with in forcing materials or objects of different contours or having areas of different density through the device, the sections 26 are connected together by equalizing means, in the form of arcuate connecting rods 46, bridging adjacent sections, at their outer sides, which are pivoted, at their ends to vertical levers 48.

The levers 48 are pivoted, intermediate their ends, on pivots 50, which are secured through the holes of the sections 26, and alternate connecting rods 46 are pivoted to the upper ends of the levers and the other connecting rods to the lower ends of the levers. With this arrangement the springs 44 and the connecting rods 46 and the levers 48 cooperate to transfer excess pressure encountered by sections 26 to the adjacent sections, and through them to other sections, whereby all of the sections then cooperate to compress material or objects forced through the tube 24 to be equally compressed by the sections and to assume a uniform cross section in compressed condition.

In operation, the object to be compressed and shaped, which is of initially larger cross section than the tube 24 is forced into the funnel 10, so as to be gradiently reduced to a cross section not substantially greater than the bore of the tube 24, with the sections 26 in contracted condition, as shown in FIGURE 6, and then pushed through the tube 24. The degree to which the object is compressed depends upon the strength of the springs 44 and the final cross section of the compressed object is uniform cylindrical. As the compressed object emerges from the lower end of the tube 24, the object can be bagged or tied to retain its compression and shape.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A compressing and shaping device comprising a rigid funnel having a small end, a tube connected at its upper end to the small end of the funnel, said tube comprising laterally overlapped sections, and spring means yieldably holding the sections in contracted relationship, said sections being hinged at their upper ends to the funnel, said sections having leading and trailing edges, the leading edges of adjacent sections underlapping the trailing edges of adjacent sections, said sections having lateral lugs at their trailing edges, said spring means comprising contractile coil springs stretched between and secured to the lugs of adjacent sections.

2. A compressing and shaping device comprising a rigid funnel having a small end, a tube connected at its upper end to the small end of the funnel, said tube comprising laterally overlapped sections, and spring means yieldably holding the sections in contracted relationship, said sections being hinged at their upper ends to the funnel, said sections having leading and trailing edges, the leading edges of adjacent sections underlapping the trailing edges of adjacent sections, said sections having lateral lugs at their trailing edges, said spring means comprising contractile coil springs stretched between and secured to the lugs of adjacent sections, said funnel being polygonal and having flat downwardly tapered sides having lower edges, the sections having flat upper halves hinged at their upper edges to the lower edges of the funnel sides, said sections having arcuate lower halves and being downwardly tapered.

3. A compressing and shaping device comprising a rigid funnel having a small end, a tube connected at its upper end to the small end of the funnel, said tube comprising laterally overlapped sections, and spring means yieldably holding the sections in contracted relationship, said sections being hinged at their upper ends to the funnel, said sections having leading and trailing edges, the leading edges of adjacent sections underlapping the trailing edges of adjacent sections, said sections having lateral lugs at their trailing edges, said spring means comprising contractile coil springs stretched between and secured to the lugs of adjacent sections, said funnel being polygonal and having flat downwardly tapered sides having lower edges, the sections having flat upper halves hinged at their upper edges to the lower edges of the funnel sides, said sections having arcuate lower halves and being downwardly tapered, and pressure equalizing means connected to and spanning adjacent sections.

4. A compressing and shaping device comprising a rigid funnel having a small end, a tube connected at its upper end to the small end of the funnel, said tube comprising laterally overlapped sections, and spring means yieldably holding the sections in contracted relationship, and pressure equalizing means connected to and spanning adjacent sections.

5. A compressing and shaping device comprising a rigid funnel having a small end, a tube connected at its upper end to the small end of the funnel, said tube comprising laterally overlapped sections, and spring means yieldably holding the sections in contracted relationship, and pressure equalizing means connected to and spanning adjacent sections, comprising vertical levers pivoted intermediate their ends externally on the sections, and connecting rods extending between and pivoted to related ends of the levers.

6. A compressing and shaping device comprising a rigid funnel having a small end, a tube connected at its upper end to the small end of the funnel, said tube comprising laterally overlapped sections, and spring means yieldably holding the sections in contracted relationship, and pressure equalizing means connected to and spanning adjacent sections, comprising vertical levers pivoted intermediate their ends externally on the sections, and connecting rods extending between and pivoted to related ends of the levers, some of the connecting rods being pivoted to the lower ends of the levers and others of the connecting rods being pivoted to the upper ends of the levers.

References Cited in the file of this patent
UNITED STATES PATENTS

| | | |
|---|---|---|
| 219,718 | Groom | Sept. 16, 1879 |
| 358,898 | Sooy | Mar. 8, 1887 |
| 975,990 | Overton et al. | Nov. 15, 1910 |
| 2,823,603 | Collins | Feb. 18, 1958 |
| 2,901,875 | Hultkrans et al. | Sept. 1, 1959 |
| 2,974,457 | Saxton | Mar. 14, 1961 |

FOREIGN PATENTS

| | | |
|---|---|---|
| 205,465 | Switzerland | June 1, 1948 |